J. SUTHERLAND.
BAKING PAN.
APPLICATION FILED MAY 31, 1910.
1,002,780.
Patented Sept. 5, 1911.
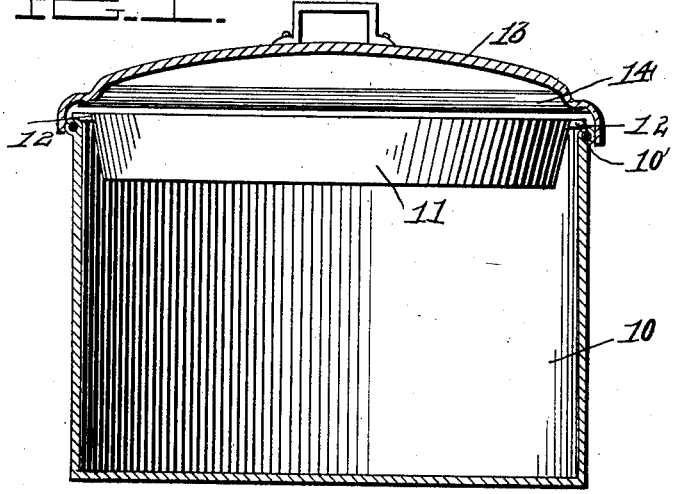
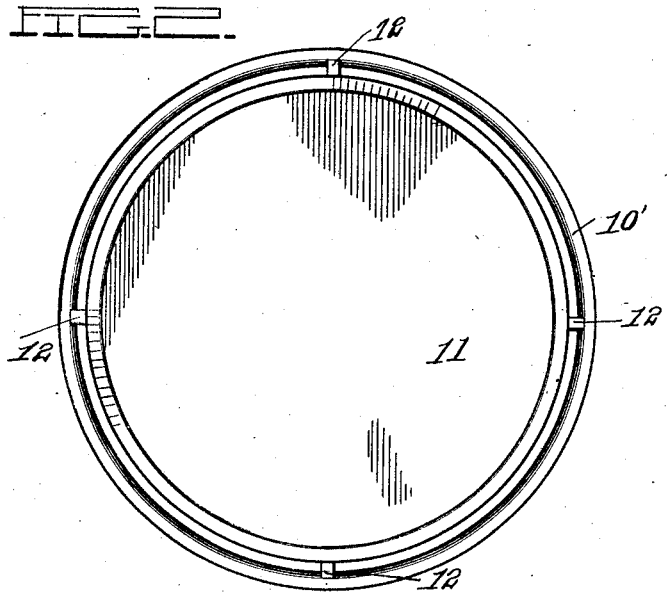
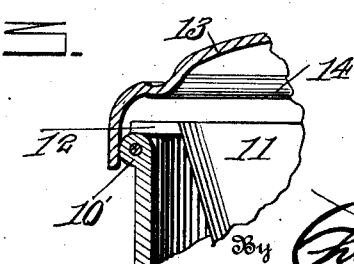
Witnesses
JH. Taylor
Henry T. Bright
Inventor
Joseph Sutherland.
By
Attorneys

UNITED STATES PATENT OFFICE.

JOSEPH SUTHERLAND, OF GLOUCESTER, MASSACHUSETTS.

BAKING-PAN.

1,002,780.     Specification of Letters Patent.     Patented Sept. 5, 1911.

Application filed May 31, 1910. Serial No. 564,269.

*To all whom it may concern:*

Be it known that I, JOSEPH SUTHERLAND, a citizen of the United States, residing at Gloucester, in the county of Essex, State of Massachusetts, have invented certain new and useful Improvements in Baking-Pans; and I do hereby declare the following to be a full, clear, and exact description of the invention, such as will enable others skilled in the art to which it appertains to make and use the same.

This invention relates to baking pans and particularly that type employed in the baking of beans.

The object of the invention resides in the construction of a baking pan of the character named which will effectually protect the contents thereof from burning during the process of cooking.

A further object of the invention also resides in providing means for maintaining the contents of the pan in a moist state.

With these and other objects in view the invention consists in the details of construction and in the combination and arrangement of parts as will be hereinafter more fully described and particularly pointed out in the appended claim.

In describing the invention in detail reference will be had to the accompanying drawings wherein like characters of reference denote corresponding parts in the several views; and in which, Figure 1 is a vertical section of a baking pan constructed in accordance with the invention; Fig. 2, a plan view of same with the lid removed; and, Fig. 3, is a fragment of the section shown in Fig. 1 on an enlarged scale.

Referring to the drawings, the invention is shown as comprising an open end receptacle 10. Disposed in the open end of said receptacle 10 is a water receiving pan 11 which is provided with a plurality of laterally extending fingers 12 which rest upon the upper edge of the receptacle 10 and thereby support the water receiving pan 11 in spaced relation to the inner wall of said receptacle. The open end of the receptacle 10 is closed by a lid 13 having its outer edge bent downwardly and frictionally engaging the bead 10′ of the receptacle 10. An inwardly projecting rib 14 is formed on the lid 13 and is disposed above the space between the pan 11 and the inner wall of the receptacle 10.

In use the pan 11 is supplied with water and the top 13 placed upon the upper end of the receptacle 10. As the water in the pan 11 is reduced to steam in the process of baking it will condense upon the under side of the lid 13 and flow to the lower edge of the rib 14 from, which point the water of condensation will gradually drop into the contents of the receptacle 10 by way of the space between the pan 11 and the inner wall of the receptacle 10. This constant addition of moisture to the contents of the pan 10 will effectually prevent scorching and burning of the same.

By the construction shown, the cover 13 can be accurately adjusted in respect to the upper edge of the water pan 11 to properly regulate the annular space for the passage of the water of condensation to the receptacle. It is further to be noted that by the employment of the rib 14 forming a part of the cover and arranged concentric with and directly above the edge of the water pan 11, the water of condensation is properly directed to the annular space between said pan and receptacle and against the inner wall of the latter.

What is claimed is:

In combination with a food receptacle, a water pan removably mounted upon the upper edge of said receptacle and of smaller diameter than the latter whereby an annular space is formed, a cover having a yielding depending flange frictionally engaging with the outer edge of said receptacle thereby rendering the cover capable of adjustment in respect to the pan for regulating the annular space for the escape of the water of condensation, and an inwardly projecting rib forming a part of the cover and arranged concentric with the upper edge of the water pan and above the annular space.

In testimony whereof, I affix my signature, in presence of two witnesses.

JOSEPH SUTHERLAND.

Witnesses:
   GEO. W. THOMPSON,
   FRANK BREATON.

---

Copies of this patent may be obtained for five cents each, by addressing the "Commissioner of Patents, Washington, D. C."